ered Sept. 5, 1967

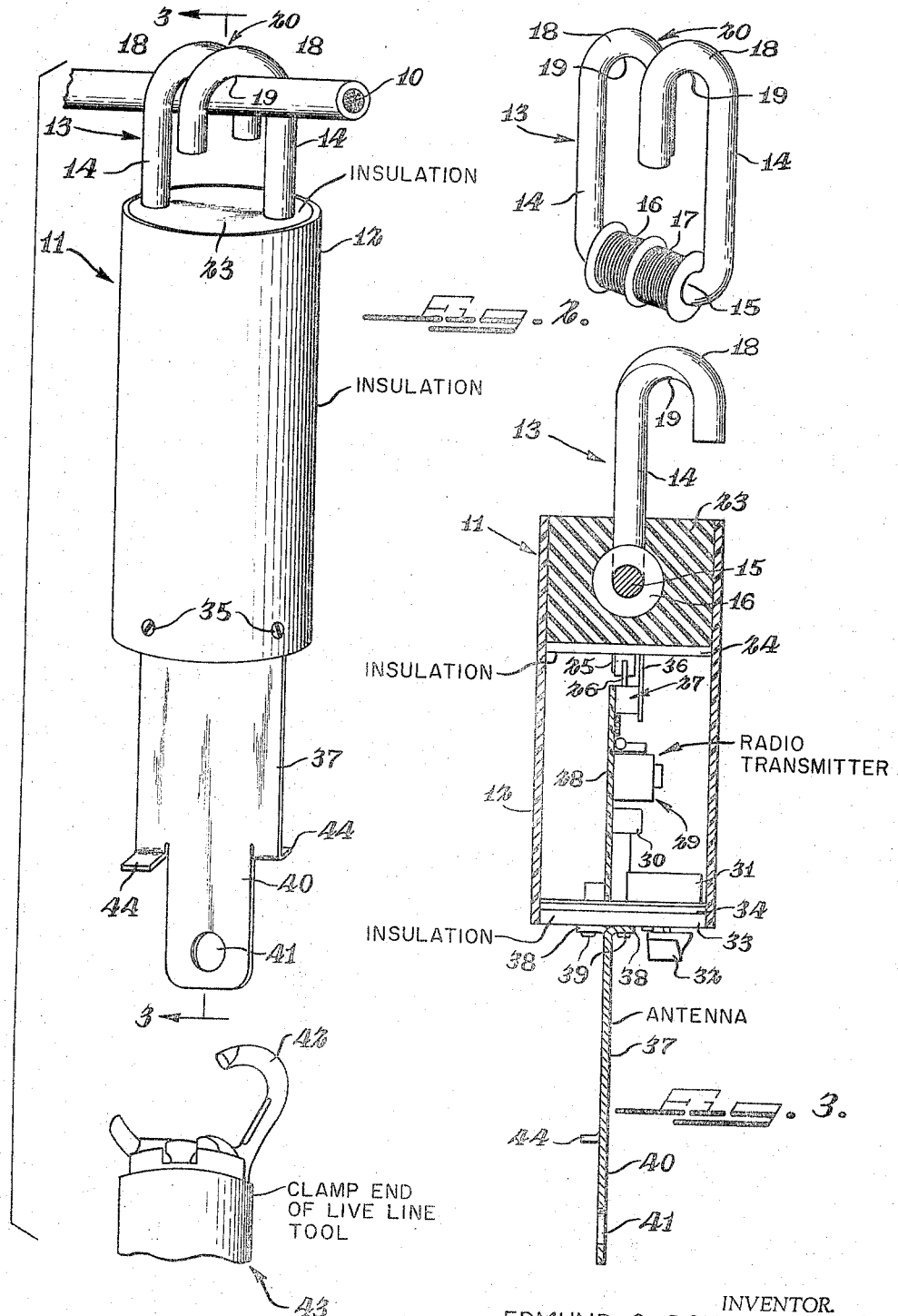

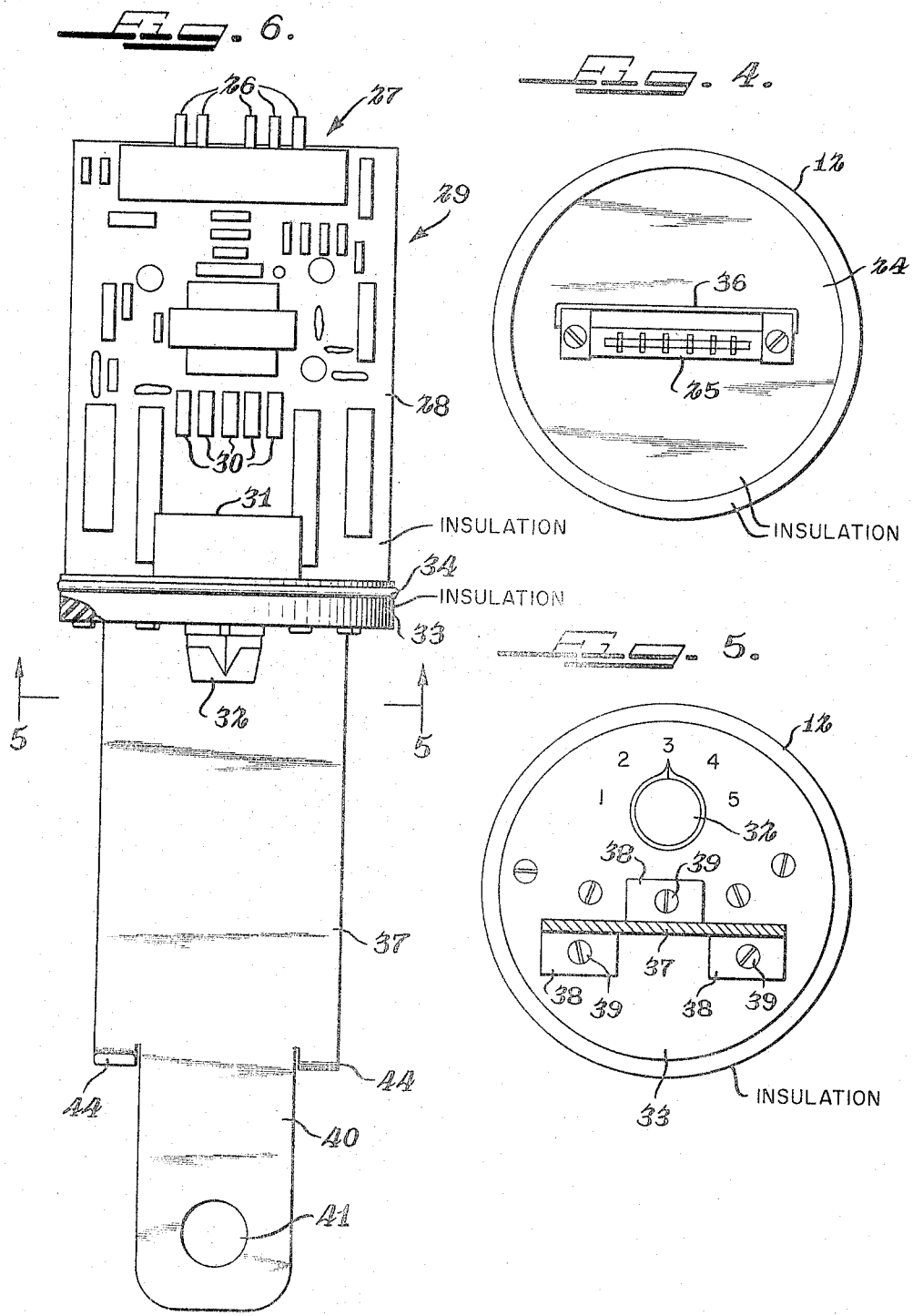

3,340,472
RADIO TRANSMITTER FOR MOUNTING ON
HIGH VOLTAGE CONDUCTOR BY LIVE
LINE TOOL
Edmund O. Schweitzer, Jr., 1002 Dundee Road,
Northbrook, Ill. 60062
Filed May 22, 1963, Ser. No. 282,450
5 Claims. (Cl. 324—127)

This invention relates, generally, to current measuring means and it has particular relation to means for measuring the flow of alternating current in a high voltage conductor. It constitutes an improvement over the constructions shown in my U.S. Patent No. 2,686,898, issued Aug. 17, 1954, and in U.S. Patent No. 3,197,702, issued July 27, 1965.

Patent No. 2,686,898 shows an electric measuring instrument that is arranged to provide a direct reading thereon of current flow through an alternating current conductor. It is arranged to be carried by a live line stick which is secured to a bracket that extends from one end of the insulating casing for the instrument. Mounted on the same end of the insulating casing is an indicating meter that is energized from a winding on a magnetic core that extends from the other end of the housing. The magnetic core defines a window for receiving the conductor in which the current flow is to be measured. An entrance slot is provided to the window by spaced portions of the magnetic core for the purpose of permitting entry of the conductor into the window by suitable manipulation of the device by the live line stick. At the end of the casing from which the magnetic core extends there is provided a notch or groove for receiving the conductor and centering it with respect to the magnetic core. This arrangement permits uniform relationship between the conductor and the magnetic core as long as the instrument is held by the lineman with the conductor in the notch or groove.

In Patent No. 3,197,702 there is disclosed a radio transmitter that is arranged to be mounted on and associated with a magnetic core that is inductively related to the high voltage power conductor through which alternating current flows. The magnetic core is provided with an energizing winding and a modulating winding. The energizing winding is connected to power a radio transmitter and cause it to generate a carrier frequency. Associated with this circuit is an oscillator that generates an audio frequency. The oscillator is arranged to be pulsed by the modulating winding with the number of pulses being determined by the magnitude of the current flow in the conductor. The carrier frequency is modulated by the pulsed audio frequency. The signal from the antenna of the radio transmitter is received by a receiver that operates at ground potential. The modulated carrier is demodulated and provision is made for audibly reproducing the pulses which can be counted to determine the number in a given time which corresponds to a given current flow in the conductor. In addition measuring means are provided which totalizes the impulses and provides on an indicating instrument the magnitude of the current flow.

Among the objects of this invention are to provide for mounting a radio transmitter of the kind and character above referred to in a suitable weatherproof housing and for manipulation by a live line tool; to provide for detachably mounting the transmitter or current measuring device on a high voltage alternating current power transmission conductor; to construct the magnetic core that links the conductor and winding means in the device in such manner that the core is capable of detachably mounting the current measuring device on the conductor by suitable manipulation of a live line tool; to provide an entrance slot in the core for receiving the conductor and to arrange the spaced end portions of the core in overlapping relation for the purpose of reducing the reluctance of the slot; to provide inverted oppositely extending U-shaped end portions on the core extending in parallel relation and adapted to receive the conductor in the bights thereof; to embed the core and winding means in a potting compound in one end of a tubular insulating housing and thereby provide a weather tight construction; to mount a radio transmitter in the housing for energization from the winding means when the core is positioned on a conductor in which alternating current flows; to interconnect the winding means and the radio transmitter by plug and socket means; to mount the radio transmitter on a support that extends into the housing from the inner side of a plug that closes the other end of the housing; to guide the support for directing engagement of the plug and socket means; to mount a bracket on the other side of the plug which bracket is adapted to receive a live line tool; and to construct the bracket of metal and use it for the antenna of the radio transmitter.

In the drawings:

FIG. 1 is a perspective view of a current measuring device embodying the present invention and illustrating how it is mounted on a high voltage conductor and showing the relationship with a live line tool that can be employed for manipulating it.

FIG. 2 is a perspective view of the core structure employed in the measuring device shown in FIG. 1.

FIG. 3 is a vertical sectional view taken generally along the line 3—3 of FIG. 1.

FIG. 4 is a view, in end elevation, of the insulating housing shown in FIGS. 1 and 3, the end closure plug and parts mounted thereon having been removed.

FIG. 5 is a sectional view taken generally along the line 5—5 of FIG. 6.

FIG. 6 is a top plan view of the radio transmitter and metallic bracket which functions as the antenna for the transmitter, these parts being shown in detached relationship with respect to the measuring apparatus shown in FIGS. 1 and 3.

Referring now particularly to FIG. 1 of the drawings, it will be observed that the reference character 10 designates a high voltage conductor that is arranged to conduct alternating current. For illustrative purposes it is pointed out that the conductor 10 can comprise one conductor of a polyphase alternating current transmission system with the conductor being energized at a voltage of the order of 34.5 kv. It will ve understood that the conductor 10 can form a part of a single phase system and that it can be energized at higher or lower voltages than the voltage just specified.

In order to measure the flow of alternating current in the conductor 10 a current measuring device, indicated generally at 11, is provided. It includes a cylindrical insulating housing 12 of suitable plastic material having a magnetic core structure, shown generally at 13, extending from the upper end. FIG. 2 shows the details of construction of the magnetic core structure 13. It includes a pair of spaced apart arms 14—14 with a connecting section 15 on which winding means in the form of an energizing winding 16 and a modulating winding 17 are located. The distal ends of the arms 14—14 are indicated at 18—18 and are of inverted U-shape and extend in opposite directions. The bights 19—19 of the inverted U-shaped distal ends 18—18 are arranged to receive the conductor 10 therein as shown in FIG. 1. These ends 18—18 are spaced apart to provide an entrance slot 20 through which the conductor 10 can be passed to position it below the lower ends of the U-shaped sections 18—18.

Thereafter, the device 11 is rotated to position the bights 19—19 in registry with the conductor 10 and the device 11 then is lowered so that it is supported solely by the U-shaped end portions 18—18.

The core structure 13 together with the windings 16 and 17 is inserted in the upper end of the insulating housing 12. Thereafter, the lower end of the core structure 13 and the windings 16 and 17 are potted by a suitable potting compound indicated at 23. For example, an epoxy resin can be used for the potting compound 23. A header disc 24 of insulating material provides a wall at the inner side of the potting compound 23 and serves to limit the flow of the compound in the fluid state and acts to hold it in position until it solidifies.

Mounted on the inner side of the header disc 24 is a socket 25 that is connected to the windings 16 and 17. The socket 25 is arranged to receive prongs 26 that extend forwardly from a plug 27 which is carried by the inner end of an insulating support 28. The insulating support 28 constitutes a circuit board for mounting a radio transmitter that is indicated, generally, at 29. The circuit connections for the radio transmitter 29 can be those that are described in detail in the appplicaton above referred to which is incorporated by reference herein and, accordingly, they will not be described.

While Patent No. 3,197,702 above referred to shows a crystal controlled radio transmitter, only a single crystal is illustrated. In order to permit two or more measuring devices 11 to be used side by side for a polyphase circuit, it is desirable that they operate on different transmitting frequencies. Accordingly, a number of crystals, indicated at 30, are provided. For illustrative purposes five crystals 30 are shown. An externally operable control switch 31 is arranged to switch the crystals 30 into the transmitting circuit one by one. A control knob 32 is mechanically connected to the control switch 31 for shifting its position to connect the desired crystal 30 into the transmitting circuit.

The circuit board support 28 and the control knob 32 are mounted on a cylindrical insulating plug 33 which, as shown in FIG. 3, closes the lower end of the insulating housing 12. An O-ring 34 surrounds the plug 33 and provides a weather tight seal with the inner surface of the lower end of the insulating housing 12. Screws 35 extending radially through the insulating housing 12 into the insulating plug 33 serve to hold the latter and parts mounted thereon securely in position.

It is desirable to provide for guiding the prongs 26 of the plug 27 into the socket 25. This action is required when the support 28 attached to the plug 33 and carrying the parts mounted thereon is inserted into the lower end of the insulating housing 12. For this purpose a guide plate 36 extends downwardly from the inner face of the header disc 24 and is arranged to be engaged by the plug 27 as the prongs 26 are moved toward the socket 25. The engagement with the guide plate 36 takes place before the plug 33 enters the lower end of the insulating housing 12. Thus it is possible to feel when the plug 27 is in engagement with the guide plate 36 and it is possible to be certain then that the prongs 26 will fit properly with the appropriate socket members of the socket 25.

On the outer side or lower side of the cylindrical insulating plug 33 there is positioned a bracket 37. Preferably it is formed of metal and is provided with oppositely extending foot portions 38 which overlie the bottom surface of the plug 33 and are secured thereto by screws 39. At its lower end the bracket 37 has a tongue 40 in which an aperture 41 is located to receive a hook 42 of a live line tool that is indicated, generally, at 43. Preferably the live line tool 43 is of the remotely operable type and for illustrative purposes it is pointed out that it can be of the hot shotgun type that is sold on the open market by of Bodendieck Tool Co., of Taylorville, Ill. The tongue 40 is arranged to be inserted into the upper end of the live line tool as limited by oppositely extending ears 44—44.

In addition to employing the bracket 37 to permit manipulation of the current measuring device 11 by the live line tool 43, the bracket 37 also functions as the antenna for the radio transmitter 29.

It will be noted that the spaced arms 14—14 and the connecting section 15 are in coplanar relation. The inverted U-shaped distal ends 18—18 are located in parallel planes that are inclined at an acute angle of about 45° away from the plane of the arms 14—14 and connecting section 15 in order to accommodate in the bights 19—19 the maximum diameter conductor 10 with or without insulation while not requiring that it follow a sinuous path between the arms 14—14. This inclined configuration reduces the effect of the entrance slot 20 in the magnetic circuit including the magnetic core structure that links the conductor 10 with the windings 16 and 17 and thus improves its efficiency over a construction in which the inverted U-shaped distal ends 18—18 are located in planes perpendicular to the plane of the arms 14—14 and connection section 15.

Any of the transmitters disclosed in my Patent No. 3,223,889, issued Dec. 14, 1965, can be detachably mounted on a high voltage alternating current power conductor in the manner disclosed in this application. When two or more transmitters are employed in close physical relation, as for use on a polyphase system, the control knobs 32 are individually adjusted to connect a different crystal 30 in the circuit in order to cause each transmitter to operate on a different and non-interfering carrier frequency.

What is claimed as new is:

1. In a device for measuring flow of alternating current in a conductor and adapted to be mounted on a live line tool:
    (a) an elongated tubular insulating housing,
    (b) a magnetic core structure extending from one end of said housing and having
        (1) a pair of spaced apart arms for receiving said conductor therebetween, and
        (2) a connecting section between said arms;
    (c) winding means on said connecting section,
    (d) insulating means mounting said core structure in said one end of said housing and providing a wall,
    (e) a cylindrical insulating plug telescoped within the other end of said housing,
    (f) a support extending inwardly from said insulating plug,
    (g) current responsive radio transmitter means on said support,
    (h) plug and socket means on said wall and on said support for detachably interconnecting said winding means and said current responsive radio transmiter means, and
    (i) a bracket secured to and extending from said insulating plug for receiving at its distal end said live line tool.

2. The invention, as set forth in claim 1, wherein the bracket is formed of metal and functions as the antenna for the radio transmitter.

3. The invention, as set forth in claim 1, wherein:
    (a) the radio transmitter means is crystal controlled and is provided with a plurality of crystals for operation on different carrier frequencies; and
    (b) externally operable switch means on the insulating plug functions to shift the transmitter from one crystal to another crystal.

4. A magnetic core structure for application to an alternating current conductor comprising:
    (a) a pair of laterally spaced arms,
    (b) a connecting section between said arms at one end thereof and in coplanar relation thereto,
    (c) winding means on said connecting section, and
    (d) inverted symmetrical U-shaped sections on the other ends of said arms extending oppositely in planes intersecting at acute angles the plane of said arms and said connecting section for receiving a straight portion of said conductor in each of the bights of said U-shaped sections and along the sides of said arms facing each other.

5. Means for measuring alternating current flow in a conductor of a high voltage power transmission line comprising:
(a) a magnetic core assembly including a magnetic core for mounting on said conductor to have induced therein alternating magnetic flux generated by said current flow and winding means on said core into which alternating current is induced by said alternating magnetic flux,
(b) a casing mounting said magnetic core assembly at one end,
(c) a radio transmitter in said casing including a chassis therefor,
(d) said magnetic core assembly and said chassis having mating plug and socket means such that when said transmitter is in said casing said winding means and said chassis are detachably connected, and
(e) live line stick attaching means secured to said chassis for mounting said transmitter in and removing it from said casing.

References Cited

UNITED STATES PATENTS

| | | | |
|---|---|---|---|
| 2,089,083 | 8/1937 | Arey | 324—129 |
| 2,546,093 | 3/1951 | Gilbert | 324—127 |
| 2,686,898 | 8/1954 | Schweitzer | 324—127 |
| 2,724,821 | 11/1955 | Schweitzer | 324—127 XR |
| 2,729,788 | 1/1956 | Schweitzer | 324—127 |
| 2,953,757 | 9/1960 | Yarrick | 331—175 XR |

RUDOLPH V. ROLINEC, *Primary Examiner.*